(12) United States Patent
Neuman et al.

(10) Patent No.: US 7,880,809 B2
(45) Date of Patent: *Feb. 1, 2011

(54) METHOD AND SYSTEM FOR MOTION ADAPTIVE DEINTERLACER WITH INTEGRATED DIRECTIONAL FILTER

(75) Inventors: Darren Neuman, Palo Alto, CA (US); Patrick Law, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/029,236

(22) Filed: Feb. 11, 2008

(65) Prior Publication Data
US 2008/0129863 A1  Jun. 5, 2008

Related U.S. Application Data

(63) Continuation of application No. 10/945,619, filed on Sep. 21, 2004, now Pat. No. 7,349,028.

(60) Provisional application No. 60/540,826, filed on Jan. 30, 2004.

(51) Int. Cl.
  *H04N 11/20* (2006.01)
(52) U.S. Cl. ..................................................... 348/448
(58) Field of Classification Search ................ None
  See application file for complete search history.

(56) References Cited

U.S. PATENT DOCUMENTS

| | | | | |
|---|---|---|---|---|
| 5,532,751 A * | 7/1996 | Lui | ................... | 348/452 |
| 6,630,961 B1 * | 10/2003 | Shin et al. | ................... | 348/448 |
| 7,023,487 B1 * | 4/2006 | Adams | ................... | 348/448 |
| 7,057,664 B2 * | 6/2006 | Law et al. | ................... | 348/448 |
| 7,075,580 B2 * | 7/2006 | Jiang | ................... | 348/448 |
| 7,233,363 B2 * | 6/2007 | Song | ................... | 348/448 |
| 7,245,326 B2 * | 7/2007 | Orlick | ................... | 348/448 |
| 7,329,625 B2 * | 2/2008 | Chang | ................... | 502/60 |
| 7,345,708 B2 * | 3/2008 | Winger et al. | ................... | 348/448 |
| 7,349,028 B2 * | 3/2008 | Neuman et al. | ................... | 348/448 |
| 7,362,336 B2 * | 4/2008 | Miller et al. | ................... | 345/589 |

* cited by examiner

*Primary Examiner*—Paulos M Natnael
(74) *Attorney, Agent, or Firm*—McAndrew, Held & Malloy, Ltd.

(57) ABSTRACT

A system and method that produces a spatial average for interlaced video in a deinterlacer. The system detects edges in the video images and determines the angle at which the edges are oriented based on the gradient in the x-direction and the gradient in the y-direction. The direction of the edge is determined using the angle information of the edge. The system may also determine the strength of the edge. Based on the determined characteristics of the edge a filter may be selected to produce a spatial average of the edge in the image.

24 Claims, 5 Drawing Sheets

METHOD AND SYSTEM FOR MOTION ADAPTIVE DEINTERLACER WITH INTEGRATED DIRECTIONAL FILTER

RELATED APPLICATIONS

This patent application is a continuation of U.S. patent application Ser. No. 10/945,619, entitled "Method And System For Motion Adaptive Deinterlacer With Integrated Direction Filter," filed on Sep. 21, 2004, and makes reference to, claims priority to and claims benefit from U.S. Provisional Patent Application Ser. No. 60/540,826, entitled "Method and System for Motion Adaptive Deinterlacer with Integrated Directional Filter," filed on Jan. 30, 2004, the complete subject matter of which is hereby incorporated herein by reference, in its entirety.

This application makes reference to:

U.S. patent application Ser. No. 10/314,525 filed Dec. 9, 2002;

U.S. patent application Ser. No. 10/945,769 filed Sep. 21, 2004;

U.S. patent application Ser. No. 10/875,422 filed Jun. 24, 2004;

U.S. patent application Ser. No. 10/945,587 filed Sep. 21, 2004;

U.S. patent application Ser. No. 10/871,758 filed Jun. 17, 2004;

U.S. patent application Ser. No. 10/945,796 filed Sep. 21, 2004;

U.S. patent application Ser. No. 10/945,817 filed Sep. 21, 2004;

U.S. patent application Ser. No. 10/945,729 filed Sep. 21, 2004;

U.S. patent application Ser. No. 10/945,828 filed Sep. 21, 2004;

U.S. patent application Ser. No. 10/946,152 filed Sep. 21, 2004;

U.S. patent application Ser. No. 10/946,153 filed Sep. 21, 2004;

U.S. patent application Ser. No. 10/945,645 filed Sep. 21, 2004; and

U.S. patent application Ser. No. 10/871,649 filed Jun. 17, 2004.

The above stated applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In the field of video compression, communication, decompression, and display, there has been for many years problems associated with supporting both interlaced content and interlaced displays, along with progressive content and progressive displays. Many advanced video systems support either one or the other format. As a result such devices as deinterlacers have become important components in many video systems. Deinterlacers convert interlaced video format into progressive video format.

Deinterlacing takes interlaced video fields and coverts them into progressive frames, at double the display rate. Certain problems may arise concerning the motion of objects from image to image. Objects that are in motion are encoded differently in interlaced fields from progressive frames. Video images, encoded in deinterlaced format, containing little motion from one image to another may be deinterlaced into progressive format with virtually no problems or visual artifacts. However, problems arise with video images containing a lot of motion and change from one image to another, when converted from interlaced to progressive format. As a result, some video systems were designed with motion adaptive deinterlacers.

Today, motion adaptive deinterlace video systems rely on multiple fields of data to extract the highest picture quality from a video signal. When motion is detected between fields, it may be very difficult to use temporal information for deinterlacing. Instead, a deinterlacing circuit must utilize a spatial filter (usually a vertical filter of the field of interest). However, often the source material has diagonal lines, or curved edges, and using a spatial filter may not yield satisfactory results. For example, diagonal or curved edges will be represented with stair-step or jaggies that are visible in the image.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system and method that produces a spatial average for interlaced video in a deinterlacer. The method comprises detecting an edge in an image and determining the direction of the edge in the image. A filter may be selected using the direction of the edge in the image and a spatial average of the edge in the image may be produced using the selected filter.

Determining the direction of the edge in the image comprises determining a gradient of the edge in a first direction, and determining a gradient of the edge in a second direction. The gradient in the first direction and the gradient in the second direction may be used to determine the angle of the edge, which may be used to determine the direction of the edge. The gradient in the first direction and the gradient in the second direction may also be used to determine the strength of the edge. The determined direction of the edge may then be used to select filter coefficients, which may be used to produce the spatial average of the edge in the interlaced video images. The filter coefficients may be programmable, thereby permitting at least one of a plurality of filter coefficients to be selected.

The system comprises circuitry capable of performing the method as described hereinabove that produces a spatial average for interlaced video in a deinterlacer.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
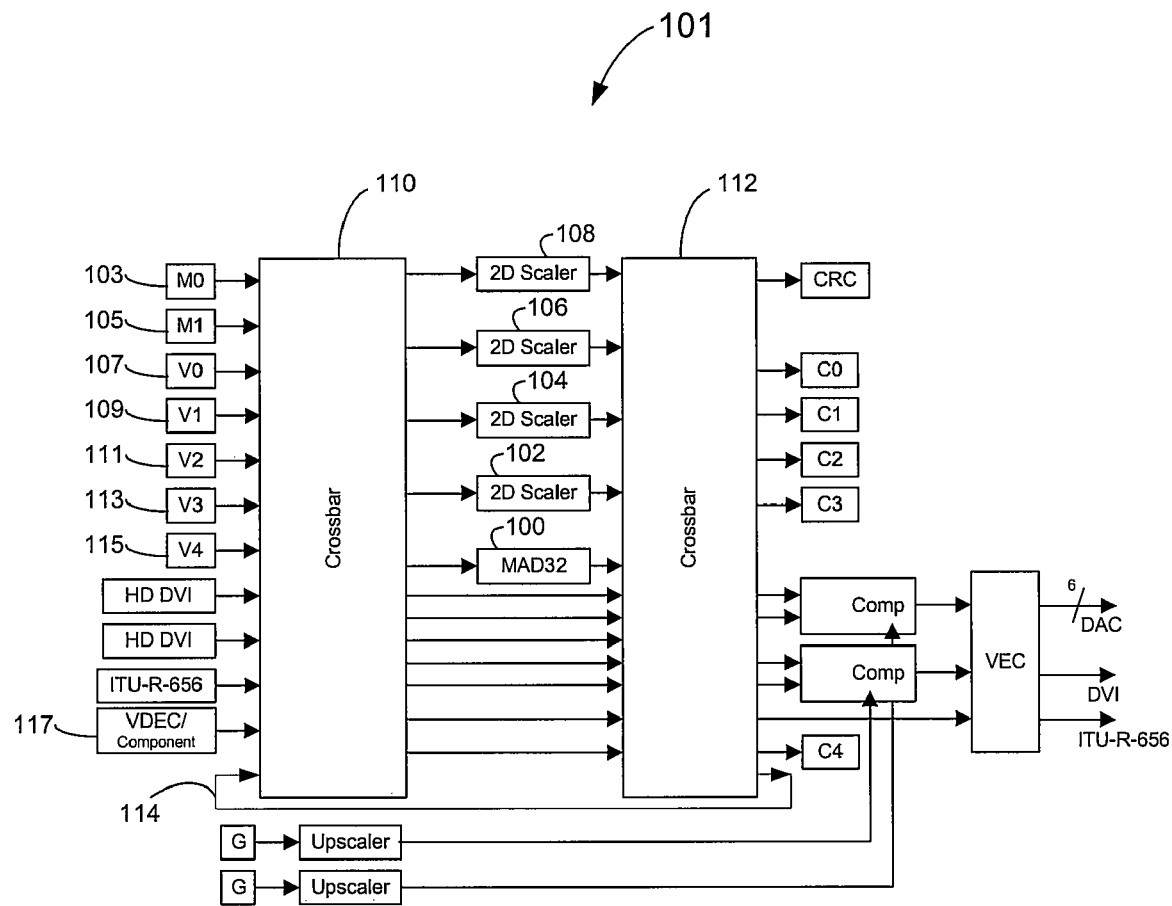
FIG. 1a illustrates a block diagram of an exemplary architecture for positioning of a MAD-3:2, in accordance with an embodiment of the invention.

Aspects of the present invention relate to processing of video signals. More specifically, certain embodiments of the invention relate to a method and system for a motion adaptive de-interlacer with an integrated directional filter.

Certain aspects of the invention may comprise methods and systems for a motion adaptive deinterlacer (MAD) capable of reverse 3:2 pull-down and 3:2 pull-down with cadence detection, which may be referred to as MAD-3:2 or MAD32, that may be utilized in a video network (VN). The algorithms and architectures for the motion adaptive deinterlacer may be adapted to acquire interlaced video fields from one of a plurality of video sources in the video network and convert the acquired interlaced video fields into progressive frames, at double the display rate, in a visually pleasing manner.

The motion adaptive deinterlacer (MAD-3:2) may be adapted to accept interlaced video input from a video bus (VB) and output deinterlaced, progressive video to the video bus (BUS) utilized by the video network. The motion adaptive deinterlacer may accept, for example, 720x480i and produce, for example, 720x480p in the case of NTSC. For PAL, the motion adaptive deinterlacer (MAD) may accept, for example, 720x576i and produce, for example, 720x576p. Horizontal resolution may be allowed to change on a field-by-field basis up to, for example, a width of 720. The motion adaptive algorithm utilized by the motion adaptive deinterlacer (MAD-3:2) may be adapted to smoothly blend various approximations for the missing pixels to prevent visible contours produced by changing decisions.

A plurality of fields of video may be utilized to determine motion. For example, in an embodiment of the invention, five fields of video may be utilized to determine motion. The motion adaptive deinterlacer (MAD) may produce stable non-jittery video with reduced risk of visual artifacts due to motion being misinterpreted while also providing improved still frame performance. The motion adaptive deinterlacer (MAD-3:2) may also provide additional fields per field type of quantized motion information, which may be selectable in order to reduce the risk of misinterpretation. For example, up to three (3) additional fields or more, per field type, of quantized low-cost motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided in order to reduce or eliminate jaggies in moving diagonal edges. The MAD-3:2 may provide reverse 3:2 pull-down for improved quality from film-based sources.

In accordance with another aspect of the invention, the algorithms and architectures for the motion adaptive deinterlacer (MAD) may also be adapted to provide bad-edit detection in order to ensure a visually pleasing transition to new cadence in situations where editing may have been carelessly performed. Furthermore, per-pixel correction may also be provided to improve the quality of subject matter containing both film and video at the same time. For example, per-pixel correction may be utilized for interlaced titles, which have been overlaid on film-based content. The motion adaptive deinterlacer (MAD-3:2) may also provide optional CPU control over, for example, 3:2 and/or 2:2 cadence detection and correction.

FIG. 1a is a block diagram of an exemplary architecture illustrating the positioning of a MAD-3:2 100, in accordance with an embodiment of the present invention. Referring to FIG. 1a, the MAD-3:2 100 along with a plurality of scalers (102, 104, 106, and 108), for example, may be positioned between a first crossbar 110 and a second crossbar 112. The first crossbar 110 may be referred to as an input crossbar and the second crossbar 112 may be referred to as an output crossbar.

The MAD-3:2 100 may comprise at least one video network input and at least one video network output and may be configured to maintain its own additional field stores. A feedback path may be provided from the output of the second crossbar 112 to the input of the first crossbar 110. This may allow any of the standard definition (SD) video sources such as the MPEG feeders 103 and 105, video feeders 107, 109, 111, 113 and 115, and/or VDEC 117, and so on, to function as an input to the MAD32 100 and/or one of the scalers 102, 104, 106, and 108. The VDEC 117 may be an analog video decoder that may process NTSC signals to separate color from luma. The MPEG feeders 103 and 105 may accept 4:2:0 and 4:2:2 video data and supply 4:2:2 video data. The video feeders 107, 109, 111, 113 and 115, may accept 4:2:2 video data and supply 4:2:2 video data. The output of the second crossbar 112 may be passed back to the first crossbar 110 via the feedback path 114.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

Figure 1B:
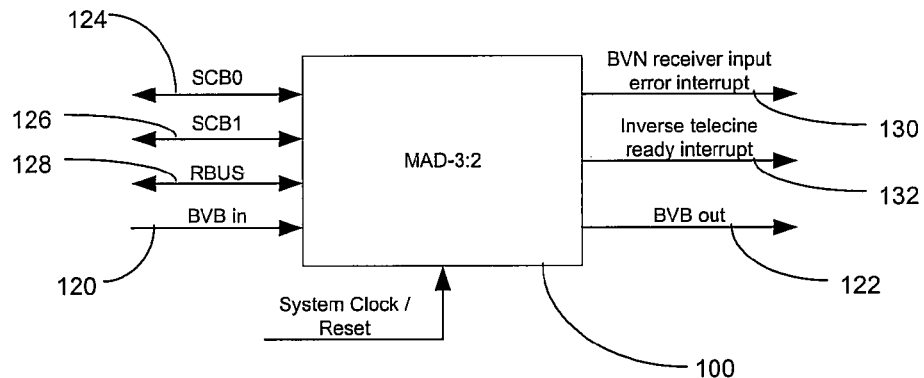
FIG. 1b illustrates a block diagram of exemplary interfaces for the MAD-3:2 shown in FIG. 1a, in accordance with an embodiment of the invention.

FIG. 1b is a block diagram illustrating exemplary interfaces for the MAD-3:2 100 shown in FIG. 1a, in accordance with an embodiment of the present invention. Referring to FIG. 1b, the MAD-3:2 100 may comprise a plurality of bus interfaces and may include the capability to generate one or more system CPU interrupts. The MAD-3:2 100 may run on, for example, a single system clock. However, the invention may not be so limited and more than one clock may be utilized. In one embodiment of the invention, the MAD-3:2 100 may include a video bus (VB) input 120, a video bus output 122, and, for example, two independent bidirectional read/write SCB client connections, SCB0 124 and SCB1 126. The SCB may be an internal bus utilized to access frames/ fields stored in the memory. The video bus (VB) input 120 may be utilized for supplying fields to the MAD-3:2 100. The video bus output 122 may allow the deinterlaced output frames to be transferred throughout the video network and pass through a scaler before reaching a composite or capture block. An RBUS interface 128 may be utilized to configure the MAD-3:2 100 or to access its status via one or more interface signals and/or registers. The RBUS may be a general-purpose bus utilized for programming registers for control and configuration of the CPU. At least a portion of the interfaces of the MAD-3:2 100 may be synchronous to a clock input of the scaler. A video network receiver input error interrupt 130 may be generated on an input field size, which may differ from a programmed field size, which is expected. An inverse telecine ready interrupt 132 may be generated for every field, or at least some fields, at the point in time when the statistics gathered in the previous field are ready to be read by a CPU or other processor.

Figure 1C:
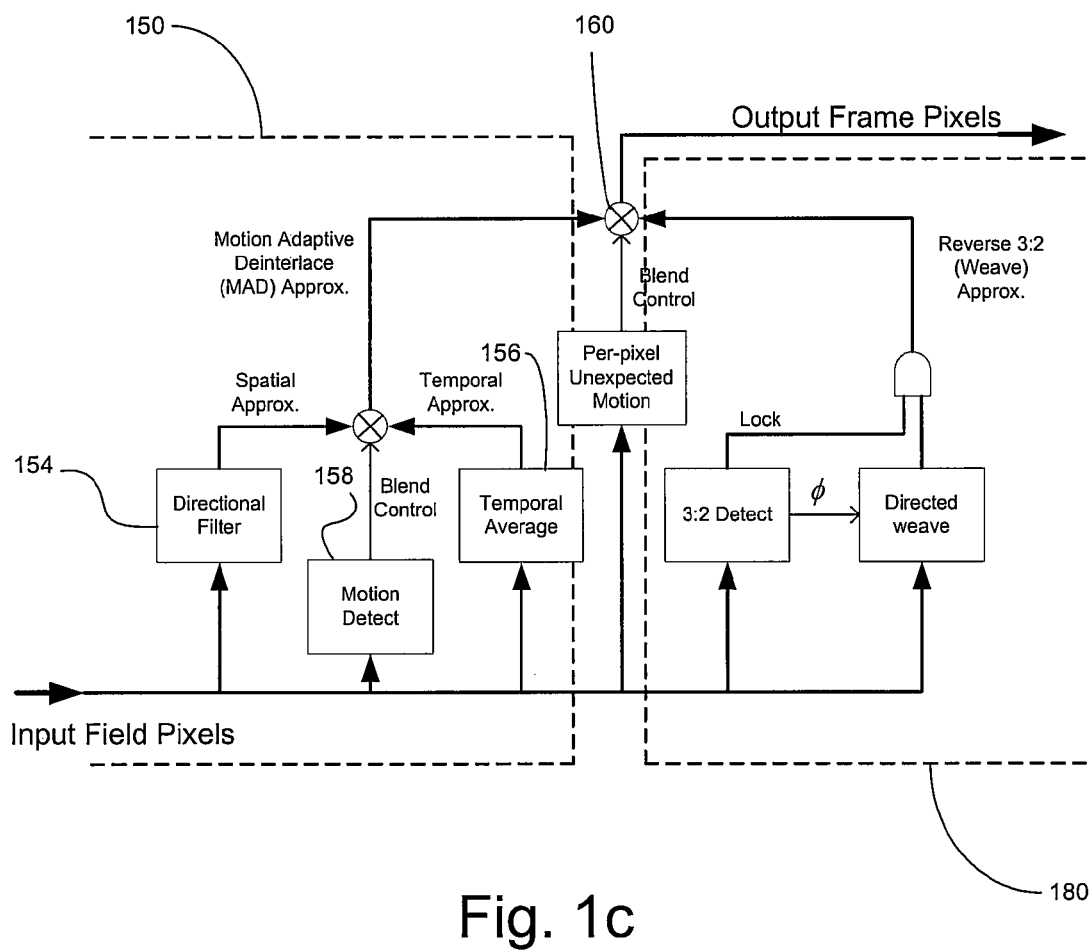
FIG. 1c illustrates a block diagram of an exemplary flow of the algorithm, which may be utilized by the MAD-3:2 of FIG. 1a and FIG. 1b, in accordance with an embodiment of the invention.

FIG. 1c is a block diagram illustrating an exemplary flow of the algorithm which may be utilized by the MAD-3:2 100 of FIG. 1a and FIG. 1b, in accordance with an embodiment of the present invention. Referring to FIG. 1c, there is shown a data flow corresponding to the algorithm utilized for deinterlacing the luma component of video. The algorithm may effectively be divided into two sub-blocks. For example, diagrammed on the left of FIG. 1c is the motion adaptive deinterlacer (MAD) method of deinterlacing 150 and on the right, there is shown the reverse 3:2 pulldown method 180. For every output pixel, motion adaptive deinterlacing 150, reverse 3:2 pulldown 180, or a blend 160 of motion adaptive deinterlacing and reverse 3:2 deinterlacing may be utilized to determine a motion-adapted value of the output pixel under consideration.

The motion adaptive deinterlacer (MAD) 150 may comprise a directional filter 154, a temporal average 156, and a blender 158. The MAD 150 may comprise suitable logic, code, and/or circuitry and may be adapted for performing the MAD method of deinterlacing. A processor may be adapted to perform the operation of the MAD 150. The MAD 150 may comprise local memory for storage of data and/or instructions. The directional filter 154 may comprise suitable logic, code, and/or circuitry and may be adapted for spatially approximating the value of the output pixel. The temporal average 156 may comprise suitable logic, code, and/or circuitry and may be adapted for temporal approximation of the value of the output pixel. The blender 158 may comprise suitable logic, code, and/or circuitry and may be adapted to combine the temporal and spatial approximations of the value of the output pixel.

In operation, the MAD 150 may receive input field pixels from an interlaced video field and convert them into output frame fields in a progressive frame, at double the display rate. The horizontal resolution of the input to the MAD 150 may change on a field-by-field basis. The MAD 150 may utilize a motion adaptive algorithm that may smoothly blend various approximations for the output pixels to prevent visible contours, which may be produced by changing decisions. In an embodiment of the present invention, it may be necessary to determine the amount of motion around each output pixel, to use an appropriate approximation for the output pixel. The MAD 150 may utilize the directional filter 154, the temporal average 156, and the blender 158 to obtain a motion-adapted value for the output pixel that is visually pleasing.

Figure 2:
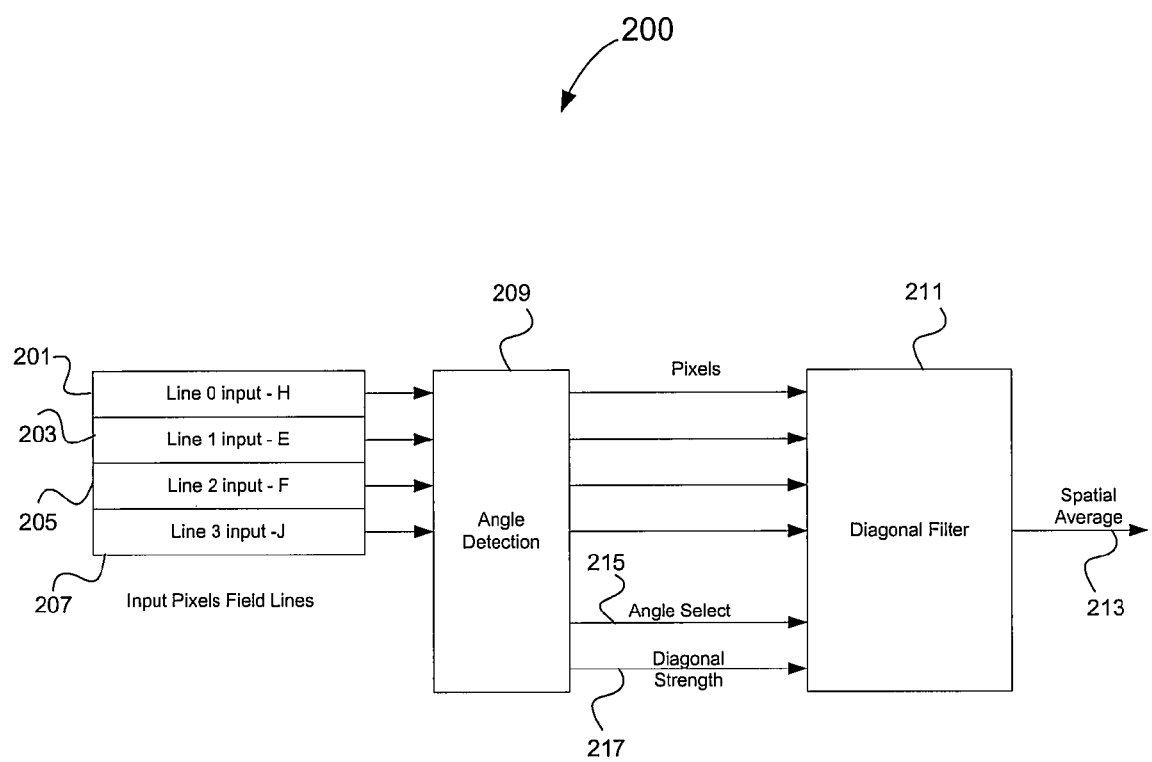
FIG. 2 illustrates a block diagram of an exemplary directional filter that may be integrated into a motion adaptive de-interlacer and utilized for motion adaptive deinterlacing with integrated directional filtering, in accordance with an embodiment of the present invention.

FIG. 2 illustrates a block diagram of an exemplary directional filter 200 that may be integrated into a motion adaptive de-interlacer and utilized for motion adaptive deinterlacing with integrated directional filtering, in accordance with an embodiment of the present invention. The directional filter 200 may be, for example, the directional filter 154 of the MAD 150 of FIG. 1c. A plurality of pixels may be read from line buffers every cycle and processed at the clock rate. For example, four pixels 201, 203, 205 and 207 may be read from the line buffers every cycle and processed at the clock rate. The pixels may be arranged in, for example, a vertical order H, E, F, J from top to bottom. The current pixel O, which is missing, or part of an absent line in the interlaced field. Pixels E and F may be directly above and below pixel O, in the present lines in the interlaced field, and pixels H and J may be the pixels directly above pixel E and below pixel F in present lines in the interlaced field. U.S. patent application Ser. No. 10/945,796 filed Sep. 21, 2004 entitled "Pixel Constellation for Motion Detection in Motion Adaptive Deinterlacer" discloses an exemplary pixel constellation that may be utilized in connection with the present invention for pixels H, E, F, and J. Accordingly, U.S. Provisional Patent Application Ser. No. 10/945,796 filed Sep. 21, 2004 is hereby incorporated herein by reference in its entirety.

The directional filter 200 may receive the pixels 201, 203, 205 and 207 from the line buffers, and produce a spatial average using a process of adaptive diagonal filtering. The directional filter 200 may comprise an angle detection block 209 and a diagonal filter block 211. The angle detection block 209 may examine an array of pixels to determine the angle and strength of gradients in the source picture. The diagonal filter block 211 may utilize an array of pixels and the angle information 215 outputted by the angle detection block 209 to select one of a plurality of filter kernels and blend the resulting diagonal filter with a vertical FIR based on the strength of the diagonal information 217 outputted by the angle detection block 209. The resulting output 213 may be used as a spatial average in the motion adaptive de-interlacer (MAD).

Filtering in the directional filter 200 may be performed on field data entirely within a field. As a result the directional filter 200 may be immune from motion artifacts. Additionally, there may be no motion in the MAD, in which case the output spatial average 213 may not be used elsewhere in the MAD. As a result the diagonal filter 200 may only affect images with motion.

Figure 3:
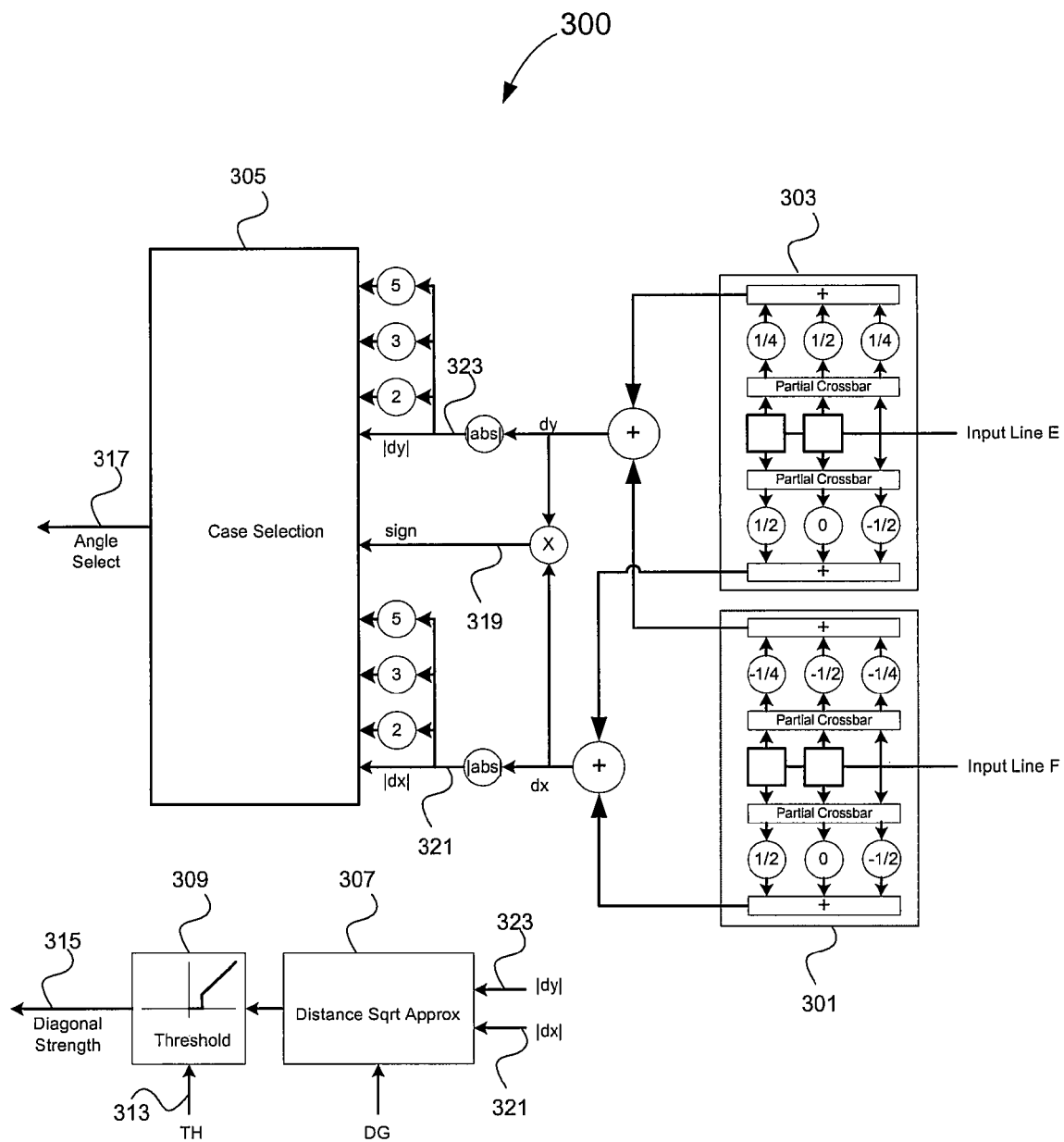
FIG. 3 illustrates a block diagram of an exemplary angle detection block that may be integrated in a directional filter and utilized for motion adaptive deinterlacing with integrated directional filtering, in accordance with an embodiment of the present invention.

FIG. 3 illustrates a block diagram of an exemplary angle detection block 300 that may be integrated in a directional filter and utilized for motion adaptive deinterlacing with integrated directional filtering, in accordance with an embodiment of the invention. The angle detection block 300 may be, for example, the angle detection block 209 of the directional filter 200 of FIG. 2. The angle detection block 300 may output an angle select signal 317 and a diagonal strength signal 315 per clock cycle. The angle detection block 300 may comprise a delta x (dx) kernel and a delta y (dy) kernel, comparison block 305 for angle selection; and distance approximation block 307 with a threshold block 309 for diagonal strength determination.

Delta x (dx) kernel and delta y (dy) kernel may be computed using vertical and horizontal edge detectors 301 and 303 respectively on, for example, a 3×2 array of pixels from lines E and F. Ultimately, the vertical edge detector 301 may determine the gradient in the y-direction, which may indicate whether there is a change in the vertical direction in a field. Similarly, the horizontal edge detector 303 may determine the gradient in the x-direction, which may indicate whether there is a change in the horizontal direction in the field. The dx kernel may be represented as:

[½, 0, −½]
[½, 0, −½]

The dy kernel may be represented as:

[¼, ½, ¼]
[−¼, −½, −¼]

A partial crossbar may be utilized to repeat pixels at the boundaries before they are multiplied. A gradient in both the x- and y-directions may indicate the presence of a diagonal edge. A gradient in only the x-direction may indicate the presence of a vertical edge, and a gradient in only the y-direction may indicate the presence of a horizontal edge.

The comparison block 305 may receive scaled values 321 and 323 of abs |dx| and abs |dy| respectively, as well as a sign value 319 to determine the angle of the gradient in the source image. The case selection using comparisons of |dx| and |dy| may be accurate to within, for example, about 0.001 radians of a true arc-tangent (arctan) function, but may be considerably cheaper. A modification to a true absolute value may be made to prevent overflow. When the delta x kernel |dx|=(−256), the absolute value |dx|=255. Similar absolute value operation for |dy| may be used.

U.S. patent application Ser. No. 10/946,153 filed Sep. 21, 2004 entitled "Method and System for Interpolator Direction Selection During Edge Detection" discloses a method for determining the direction and angle of an edge using |dx| and |dy|. Accordingly, U.S. patent application Ser. No. 10/946,153 filed Sep. 21, 2004 is hereby incorporated herein by reference in its entirety.

The resulting angle selection value 317 may result in a selection of one of, for example, 7 filter kernels comprising {NWW, NW, NNW, N, NNE, NE, NEE} each indicating a direction corresponding to the resulting angle. An additional filter kernel HOR may be utilized for horizontal filtering. Similar results may be achieved using the N filter in this condition. The comparison block 305 may produce one angle selection per cycle.

The distance approximation block 307 may determine the strength of the diagonal, which may be determined using the Cartesian distance:

$$d=\sqrt{dx^2+dy^2}$$

The ideal distance equation may be complicated to realize with simple hardware because of the squares and square root. Instead, an approximation may be implemented utilizing simpler methods to determine the distance value. U.S. patent application Ser. No. 10/945,645 filed September 21 entitled "Method and System for Detecting Diagonal Strength of an Edge for an Image" discloses a method for determining the distance using an approximation. Accordingly, U.S. patent application Ser. No. 10/945,645 filed September 21 is hereby incorporated herein by reference in its entirety.

Following the distance approximation block 307, there may be the threshold block 309. In the threshold block 309, if
(d<TH) then Diagonal Strength=0
(d>=TH) then Diagonal Strength=d As a result, depending on the threshold, weak edges in an image may get forced to zero and get treated as if there is no edge at all. The value of the threshold TH may be programmable. If the diagonal strength is 0, the vertical FIR may be utilized by default.

The threshold block 309 may be adapted to force the follow-on diagonal filter blend circuit to default to a simple 4-tap vertical filter in images where the diagonal content may not be particularly strong. The output signal diagonal strength 315 may be a value in the range {0-150}.

Figure 4:
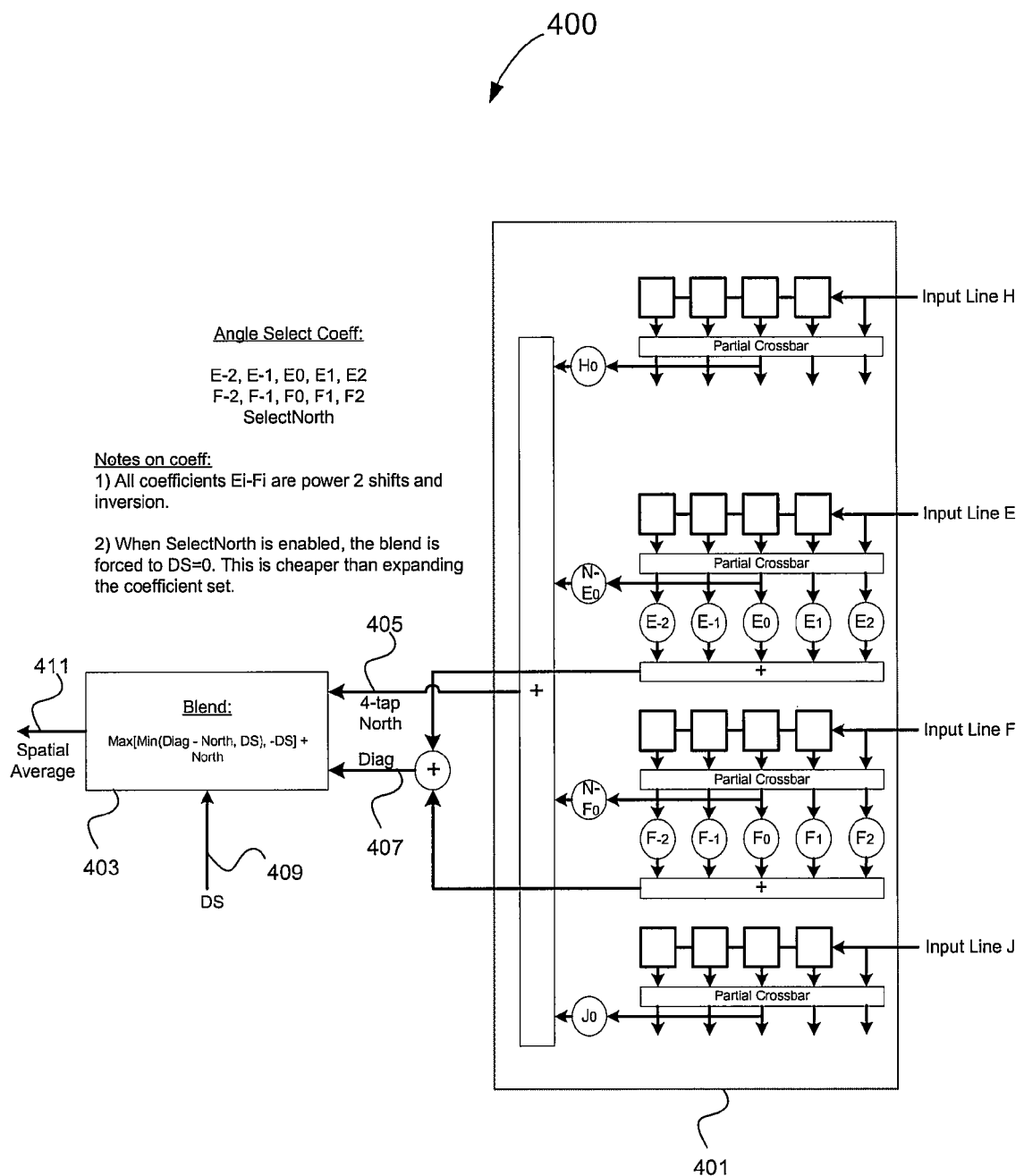
FIG. 4 illustrates a block diagram of an exemplary diagonal filter block that may be integrated in a directional filter, in accordance with an embodiment of the present invention.

FIG. 4 illustrates a block diagram of an exemplary diagonal filter block 400 that may be integrated in a directional filter, in accordance with an embodiment of the invention. The diagonal filter block 400 may be, for example, the diagonal filter block 211 of the directional filter 200 of FIG. 2. The diagonal filter 400 may utilize the input pixel values in addition to the angle selection signal 215 and diagonal strength signal 217 outputted by the angle detection block 209 to implement a 2-D x-y filter kernel, and blend with a vertical 4-tap FIR. The diagonal filter 400 may be adapted to output a single luma value as the spatial average 411 every clock cycle. The diagonal filter 400 may comprise a 2-D x-y filter 401, and a blend function 403.

The 2-D x-y kernel of diagonal filter 400 may be implemented with, for example, a 5-pixel horizontal filter by 4-line vertical filter. The 4-line vertical filter may be utilized to compute the N (north) FIR filter. The remaining diagonal kernels may utilize a 5-pixel horizontal by 2-line vertical filter. The x-y kernel may output every cycle both a value 405 for N (north) and a diagonal value 407 for one of the other directional filters {NWW, NW, NNW, NNE, NE, NEE} depending upon the selected coefficients for $\{E_{-2}\ E_{-1}\ E_0\ E_1\ E_2\}$ and $\{F_{-2}\ F_{-1}\ F_0\ F_1\ F_2\}$ based on the direction determined by the angle detection block 209. The selection of the filters may be determined using the angle selection signal 215 and may, for example, consist of the following choices:

$$P = \begin{bmatrix} \cdot & \cdot & H & \cdot & \cdot \\ E_{-2} & E_{-1} & E_0 & E_1 & E_2 \\ F_{-2} & F_{-1} & F_0 & F_1 & F_2 \\ \cdot & \cdot & J & \cdot & \cdot \end{bmatrix}$$

The table below illustrates exemplary directional interpolators that may be utilized by the motion adaptive de-interlacer with integrated directional filter 200 based on the direction of the diagonal, in accordance with an embodiment of the invention.

$$\text{Int}_N = \begin{bmatrix} 0 & 0 & -0.046875 & 0 & 0 \\ 0 & 0 & 0.546875 & 0 & 0 \\ 0 & 0 & 0.546875 & 0 & 0 \\ 0 & 0 & -0.046875 & 0 & 0 \end{bmatrix} \quad \text{Int}_E = \begin{bmatrix} 0 & 0 & 0 & 0 & 0 \\ 0 & 0 & 0.5 & 0 & 0 \\ 0 & 0 & 0.5 & 0 & 0 \\ 0 & 0 & 0 & 0 & 0 \end{bmatrix}$$

$$\text{Int}_{NE} = \begin{bmatrix} 0 & 0 & 0 & 0 & 0 \\ 0 & 0 & 0 & 0.5 & 0 \\ 0 & 0.5 & 0 & 0 & 0 \\ 0 & 0 & 0 & 0 & 0 \end{bmatrix} \quad \text{Int}_{NW} = \begin{bmatrix} 0 & 0 & 0 & 0 & 0 \\ 0 & 0.5 & 0 & 0 & 0 \\ 0 & 0 & 0 & 0.5 & 0 \\ 0 & 0 & 0 & 0 & 0 \end{bmatrix}$$

$$Int_{NNE} = \begin{bmatrix} 0 & 0 & 0 & 0 & 0 \\ 0 & 0 & 0.25 & 0.25 & 0 \\ 0 & 0.25 & 0.25 & 0 & 0 \\ 0 & 0 & 0 & 0 & 0 \end{bmatrix} \quad Int_{NNW} = \begin{bmatrix} 0 & 0 & 0 & 0 & 0 \\ 0 & 0.25 & 0.25 & 0 & 0 \\ 0 & 0 & 0.25 & 0.25 & 0 \\ 0 & 0 & 0 & 0 & 0 \end{bmatrix}$$

$$Int_{NEE} = \begin{bmatrix} 0 & 0 & 0 & 0 & 0 \\ 0 & 0 & 0 & 0.25 & 0.25 \\ 0.25 & 0.25 & 0 & 0 & 0 \\ 0 & 0 & 0 & 0 & 0 \end{bmatrix} \quad Int_{NWW} = \begin{bmatrix} 0 & 0 & 0 & 0 & 0 \\ 0.25 & 0.25 & 0 & 0 & 0 \\ 0 & 0 & 0 & 0.25 & 0.25 \\ 0 & 0 & 0 & 0 & 0 \end{bmatrix}$$

The coefficients in the diagonal filter 400 may be implemented with, for example, a simple shift and inversion in order to reduce hardware cost. A partial crossbar may be utilized to repeat pixels at the boundaries of the picture. This may apply to both the vertical N (north) filter and/or the diagonal filter kernel selected for diagonal filtering.

The blend control parameter DS 409 may be derived from a select north signal and the diagonal strength signal 217 from the angle detection block 209. The DS signal 409 may be driven to 0 when select north is active, thus forcing the blend to select pure north (N) for the spatial average output 411. In other conditions, the DS signal 409 may be used to merge midway between north (N) and diagonal filter (diag) depending upon the diagonal strength. The spatial average output 411 may be determined in one of several ways using the blend control parameter along with the diagonal filter and north signals.

Combining the directional filter 200 adaptively with de-interlacing technology may provide high quality stills with weave function, and produce high quality motion with compass filter. Additionally, the directional filter may have unique angle detection capabilities, and may blend multiple directions for smooth transitions in the source material. Accordingly, a method and system for motion adaptive de-interlacer with an integrated directional filter 200 may provide a better quality video signal and a good complement to de-interlace processing for motion, while utilizing a low cost implementation.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system that produces a spatial average for interlaced video in a deinterlacer, the system comprising:
   a first processing circuitry that detects an edge, the edge's direction, and strength of the edge in the direction, wherein said edge's direction is diagonal, in an image; and
   a second processing circuitry that selects a filter based on the direction of the edge detected by the first processing circuitry, and the strength of the edge in the direction to produce a spatial average.

2. The system according to claim 1 wherein the first processing circuitry comprises:
   a first circuitry that determines a gradient of the edge in a first direction; and
   a second circuitry that determines a gradient of the edge in a second direction.

3. The system according to claim 2 wherein the first processing circuitry determines the angle of the edge using the gradient in the first direction and the gradient in the second direction.

4. The system according to claim 3 wherein the first processing circuitry determine the direction of the edge using the angle of the edge.

5. The system according to claim 2 wherein the first processing circuitry determines the strength of the edge based on the gradient in the first direction and the gradient in the second direction.

6. The system according to claim 1 wherein the second processing circuitry selects filter coefficients based on the direction of the detected edge.

7. The system according to claim 6 wherein the second processing circuitry filters the detected edge using the filter coefficients to produce a spatial average of the detected edge.

8. The system according to claim 6 wherein the filter coefficients are programmable.

9. A method that produces a spatial average for interlaced video in a deinterlacer, the method comprising:
   detecting an edge in an image;
   determining the direction of the edge in the image, wherein said edge's direction is diagonal;

determining the strength of the edge in the direction;
selecting a filter using the direction of the edge in the image and the strength of the edge in the direction; and
producing a spatial average of the edge in the image using the selected filter.

10. The method according to claim 9 wherein determining the direction of the edge in the image comprises:
   determining a gradient of the edge in a first direction; and
   determining a gradient of the edge in a second direction.

11. The method according to claim 10 further comprising determining the angle of the edge using the gradient in the first direction and the gradient in the second direction.

12. The method according to claim 11 further comprising determining the direction of the edge using the angle of the edge.

13. The method according to claim 10 further comprising determining the strength of the edge based on the gradient in the first direction and the gradient in the second direction.

14. The method according to claim 9 wherein selecting filter coefficients is based on the direction of the detected edge.

15. The method according to claim 14 further comprising filtering the detected edge using the filter coefficients to produce a spatial average of the detected edge.

16. The method according to claim 14 wherein the filter coefficients are programmable.

17. A machine-readable storage having stored thereon, a computer program having at least one code section that produces a spatial average for interlaced video in a deinterlacer, the at least one code section being executable by a machine for causing the machine to perform steps comprising:
   detecting an edge in an image;
   determining the direction of the edge in the image, wherein said edge's direction is diagonal;
   determining the strength of the edge in the direction;
   selecting a filter using the direction of the edge in the image and the strength of the edge in the direction;
   producing a spatial average of the edge in the image using the selected filter.

18. The machine-readable storage according to claim 17 wherein code for determining the direction of the edge in the image comprises:
   code for determining a gradient of the edge in a first direction; and
   code for determining a gradient of the edge in a second direction.

19. The machine-readable storage according to claim 18 further comprising code for determining the angle of the edge using the gradient in the first direction and the gradient in the second direction.

20. The machine-readable storage according to claim 19 further comprising code for determining the direction of the edge using the angle of the edge.

21. The machine-readable storage according to claim 18 further comprising code for determining the strength of the edge based on the gradient in the first direction and the gradient in the second direction.

22. The machine-readable storage according to claim 17 wherein selecting filter coefficients is based on the direction of the detected edge.

23. The machine-readable storage according to claim 22 further comprising code for filtering the detected edge using the filter coefficients to produce a spatial average of the detected edge.

24. The machine-readable storage according to claim 22 wherein the filter coefficients are programmable.

* * * * *